US012627556B2

(12) United States Patent
Reddy et al.

(10) Patent No.: US 12,627,556 B2
(45) Date of Patent: May 12, 2026

(54) HANDLING DU STATE INFORMATION AND RECOVERY USING NETCONF OPERATIONAL DATA

(71) Applicant: Rakuten Symphony, Inc., Tokyo (JP)

(72) Inventors: Virendra Reddy, Bangalore (IN); Bharat Akiwate, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/029,767

(22) PCT Filed: Mar. 15, 2023

(86) PCT No.: PCT/US2023/064441
§ 371 (c)(1),
(2) Date: Mar. 31, 2023

(87) PCT Pub. No.: WO2024/191459
PCT Pub. Date: Sep. 19, 2024

(65) Prior Publication Data
US 2024/0314022 A1 Sep. 19, 2024

(51) Int. Cl.
*H04L 41/0803* (2022.01)
*H04L 41/0213* (2022.01)

(52) U.S. Cl.
CPC ...... *H04L 41/0803* (2013.01); *H04L 41/0213* (2013.01)

(58) Field of Classification Search
CPC .......................... H04L 41/0803; H04L 41/0213
USPC ......................................................... 709/220
See application file for complete search history.

(56) References Cited

U.S. PATENT DOCUMENTS

| | | | | |
|---|---|---|---|---|
| 2013/0194974 A1* | 8/2013 | Purkayastha | ....... | H04L 41/0856 |
| | | | | 370/255 |
| 2020/0367109 A1* | 11/2020 | Chen | ..................... | H04W 28/18 |
| 2022/0286910 A1* | 9/2022 | Ramakrishnan | ...... | H04W 48/08 |
| 2022/0322418 A1* | 10/2022 | Kim | ....................... | H04L 1/0008 |
| 2022/0329489 A1* | 10/2022 | Nayyar | .............. | H04L 41/0893 |
| 2022/0400412 A1* | 12/2022 | Grayson | .............. | H04B 1/0003 |

(Continued)

FOREIGN PATENT DOCUMENTS

DE          102019103055 A1          9/2019

OTHER PUBLICATIONS

Written Opinion (PCT/ISA/237) dated Jul. 21, 2023 issued by the International Searching Authority in International Application No. PCT/US 23/64441.

(Continued)

*Primary Examiner* — Suraj M Joshi
*Assistant Examiner* — Ayele F Woldemariam
(74) *Attorney, Agent, or Firm* — Sughrue Mion, PLLC

(57) ABSTRACT

In general, the current subject matter relates to storing persistent data using Network Configuration Protocol (NET-CONF) operational data. In some implementations, storing persistent data using NETCONF operational data can include receiving, at a NETCONF server from at least one microservice of a distributed unit (DU), state information for the at least one microservice, storing, in persistent storage of the NETCONF server, the received state information, fetching, by the at least one microservice from the NETCONF server, the stored state information, and recovering the DU to operational state based on the fetching.

17 Claims, 14 Drawing Sheets

(56) References Cited

U.S. PATENT DOCUMENTS

| | | | |
|---|---|---|---|
| 2023/0019773 A1* | 1/2023 | Raymond | ............. H04W 24/04 |
| 2023/0308902 A1* | 9/2023 | Yu | ......................... H04W 76/10 |
| 2024/0259879 A1* | 8/2024 | Ranganath | .......... H04L 41/5054 |

OTHER PUBLICATIONS

International Search Report (PCT/ISA/210) dated Jul. 21, 2023 issued by the International Searching Authority in International Application No. PCT/US 23/64441.

3GPP TS 38.401, "3rd Generation Partnership Project; Technical Specification Group Radio Access Network; NG-RAN; Architecture description (Release 17)," Sep. 2022.

Mitch Rappard, "Creating A Secure 5G Service Based Architecture: Part 1—Vulnerability Management," Palo Alto Networks, Jun. 7, 2022, available at <https://paloaltonetworks.com/blog/prisma-cloud/seo-5g-sba-vulnerability/>.

O-RAN Working Group 4 (Open Fronthaul Interfaces WG), Management Plane Specification, Aug. 15, 2022.

* cited by examiner

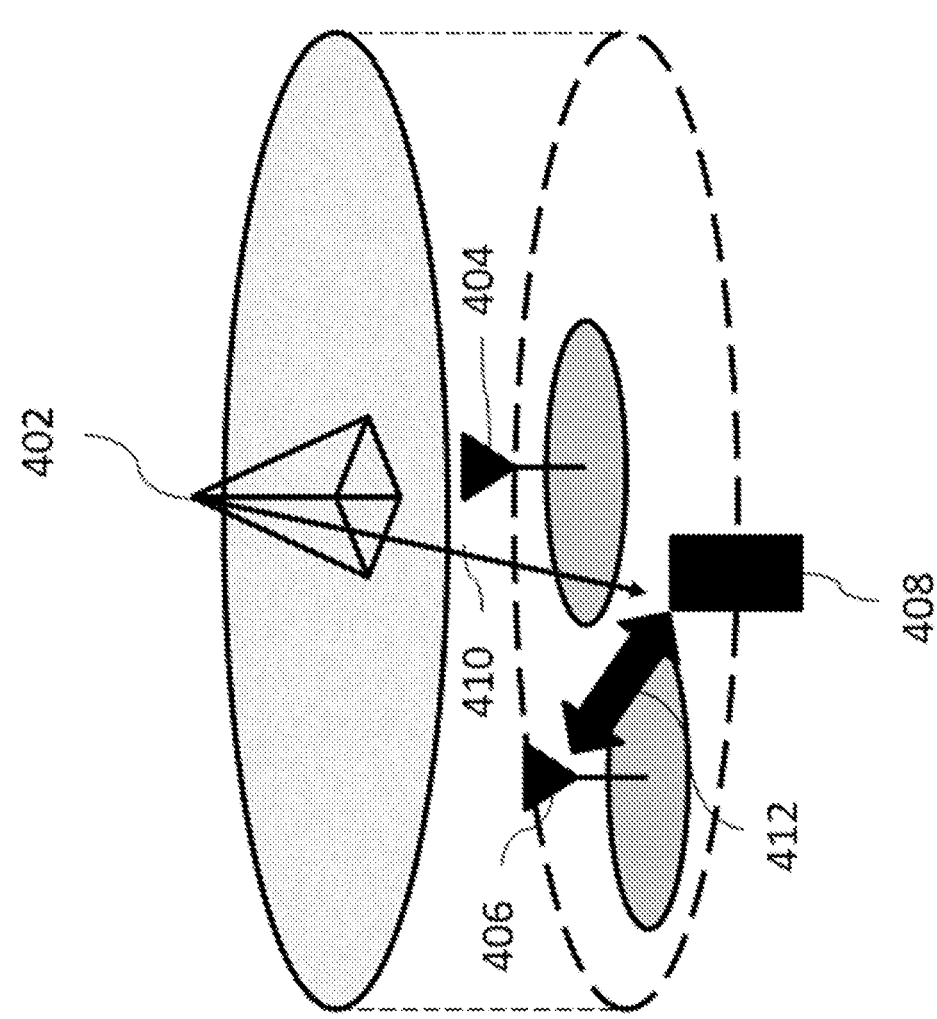
FIG. 4

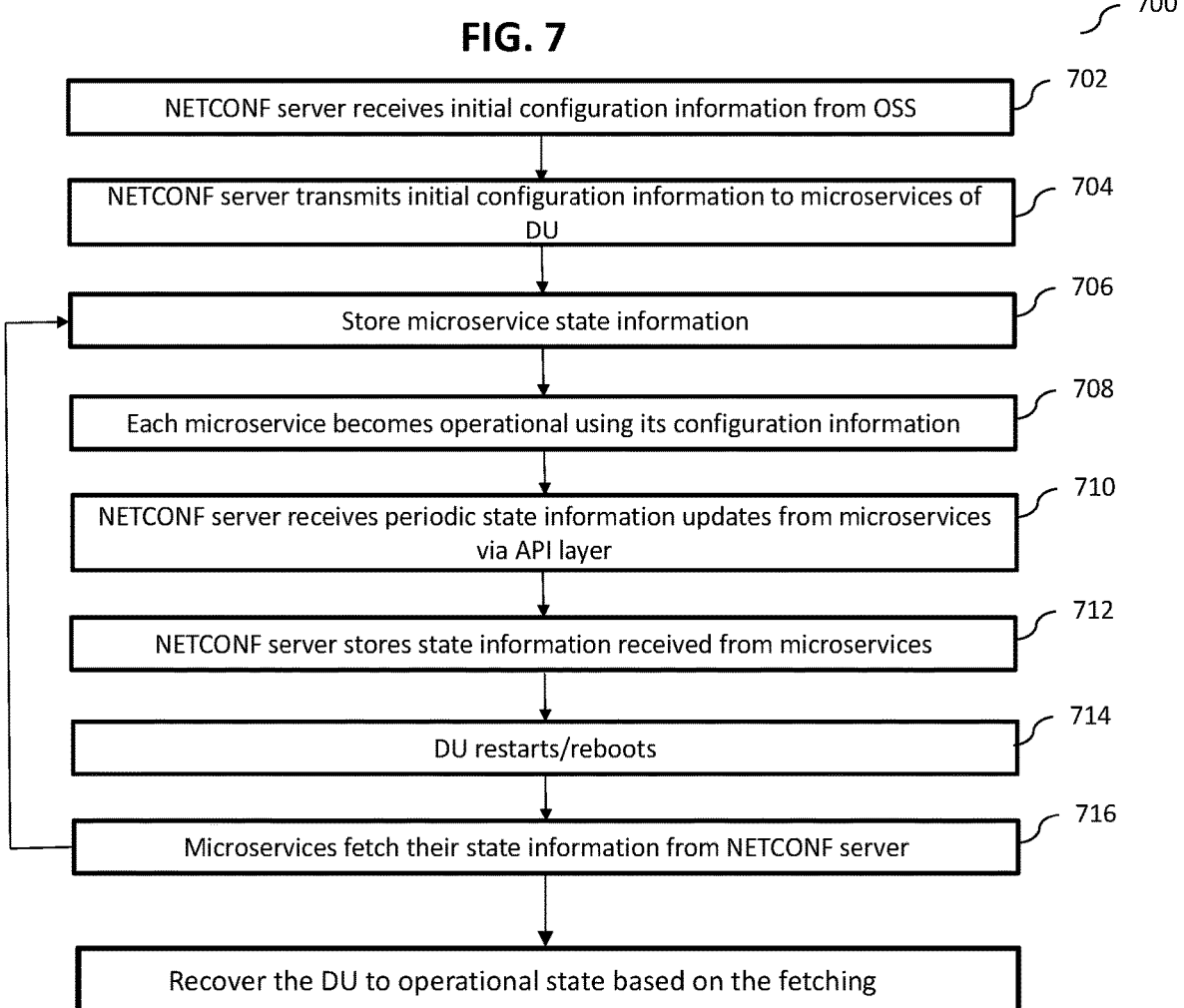

702
NETCONF server receives initial configuration information from OSS

704
NETCONF server transmits initial configuration information to microservices of DU 706
Store microservice state information 708
Each microservice becomes operational using its configuration information 710
NETCONF server receives periodic state information updates from microservices via API layer 712
NETCONF server stores state information received from microservices 714
DU restarts/reboots 716
Microservices fetch their state information from NETCONF server Recover the DU to operational state based on the fetching

HANDLING DU STATE INFORMATION AND RECOVERY USING NETCONF OPERATIONAL DATA

CROSS-REFERENCE TO RELATED APPLICATIONS

The present application claims priority to and is the 35 U.S.C. 371 United States National Phase application based on International Patent Application No. PCT/US23/64441 filed on Mar. 15, 2023 entitled "HANDLING DU STATE INFORMATION AND RECOVERY USING NETCONF OPERATIONAL DATA," which is hereby incorporated by reference in its entirety.

TECHNICAL FIELD

In some implementations, the current subject matter relates to telecommunications systems, and in particular, to handling distributed unit (DU) state information and recovery of an operational state of the DU using Network Configuration Protocol (NETCONF) operational data.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

A base station for a cellular network can include a centralized unit (CU), one or more distributed units (DUs) communicatively coupled to the CU, and one or more radio units (RUs) each communicatively coupled to at least one of the one or more DUs and each configured to be communicatively coupled to one or more mobile telephones and/or other user equipments (UEs). Each of the one or more DUs can support one or more cells. The DU has a small amount of memory in which it can maintain configuration information, such as a cell state, for each of the DU's one or more microservices, as configuration information is needed for proper microservice operation and can be different for different microservices. During the course of a DU's operation, the DU may need to be restarted or rebooted, such as because of a software crash, because of maintenance downtime planned by an operator of the DU, or because of another reason. Restarting or rebooting the DU causes the DU to lose stored configuration information for the microservices. The configuration information must therefore be re-established, which can cause delays in UE service and thus worsen customer experience.

SUMMARY

In some implementations, the current subject matter relates to a computer-implemented method. The method can include receiving, at a Network Configuration Protocol (NETCONF) server from at least one microservice of a distributed unit (DU), state information for the at least one microservice, storing, in persistent storage of the NETCONF server, the received state information, fetching, by the at least one microservice from the NETCONF server, the stored state information, and recovering the DU to operational state based on the fetching.

The method may allow state information for the at least one microservice to not be re-established following restart or reboot of the DU, which may reduce delays in UE service that would otherwise result from needing to re-establish the state information from its default setting.

In some implementations, the current subject matter can include one or more of the following optional features.

In some implementations, the at least one microservice can fetch the state information following a restart or a reboot of the DU for the purpose of recovering the DU to the operational state.

In some implementations, the method can further include receiving, at the NETCONF server from the at least one microservice, at least one update to the state information for the at least one microservice, the method can further include storing, in persistent storage of the NETCONF server, the received updated state information, and the at least one microservice can fetch the state information most recently received by the NETCONF server for the purpose of recovering the DU to the operational state after a restart or a reboot.

In some implementations, the NETCONF server can receive the state information via an application programming interface (API) layer.

In some implementations, the method can further include storing, in non-persistent storage of the DU, the state information for the at least one microservice.

In some implementations, the state information can include at least one of cell state information, baseband state information, and centralized unit control plane (CU-CP) connection information.

In some implementations, a base station can include the NETCONF server and the DU, and the base station can include a gNodeB or an eNodeB.

In some implementations, a wireless communication system base station can include the at least one processor and the at least one non-transitory storage media.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 4 illustrates an exemplary 3GPP split architecture to provide its users with use of higher frequency bands;

FIG. 7 an exemplary method, according to some implementations of the current subject matter;

DETAILED DESCRIPTION

The current subject matter can provide for systems and methods that can be implemented in wireless communications systems. Such systems can include various wireless communications systems, including 5G New Radio communications systems, long term evolution communication systems, etc.

In general, the current subject matter relates to storing persistent data using NETCONF operational data.

In some implementations of the current subject matter, state information for at least one microservice of a distributed unit (DU) of a base station in a wireless communications system can be stored persistently using NETCONF operational data. Thus, when the DU is restarted or rebooted, such as because of a software crash, because of maintenance downtime planned by an operator of the DU, or because of another reason, the at least one microservice's state information from before the restart or reboot can be retrieved and used by the DU. More particularly, following the restart or reboot, the DU can begin operation of the at least one microservice using the most recent persistently stored state information for the at least one microservice, thereby allowing the DU to begin operation of the at least one microservice using state information more likely to be appropriate for each particular microservice than if default state information is used to operate the at least one microservice the following restart or reboot. State information for the at least one microservice therefore does not need to be re-established following the restart or reboot, which may reduce delays in UE service that would otherwise result from needing to re-establish the state information from its default setting.

Standards of the O-RAN Alliance defining one or more aspects that may be related to the current subject matter include the O-RAN Working Group 4 (Open Fronthaul Interfaces WG) Management Plane Specification. 3GPP standards may also be related to one or more aspects of the current subject matter.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1*a-c* and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
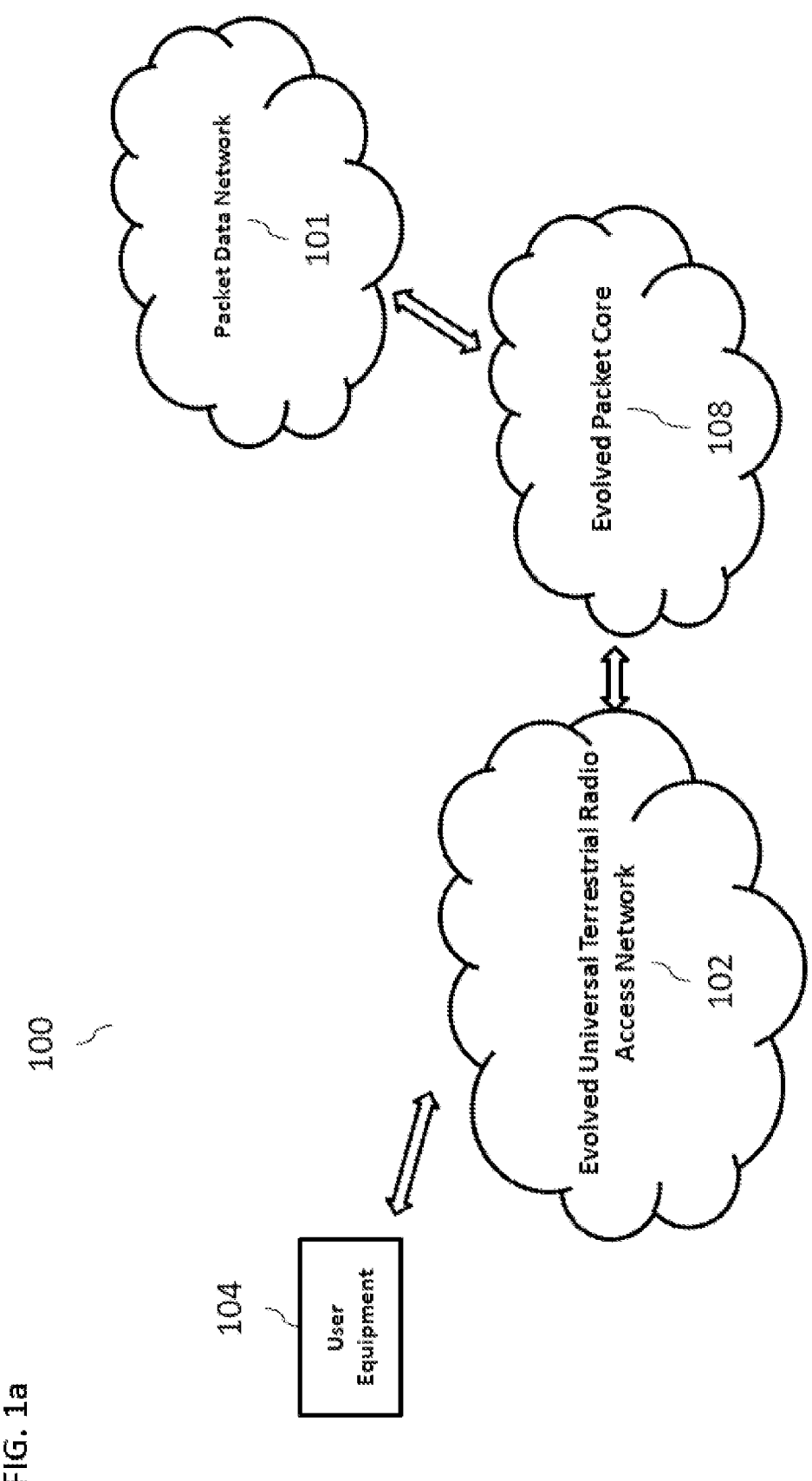
FIG. 1a illustrates an exemplary conventional long term evolution ("LTE") communications system.
Figure 1B:
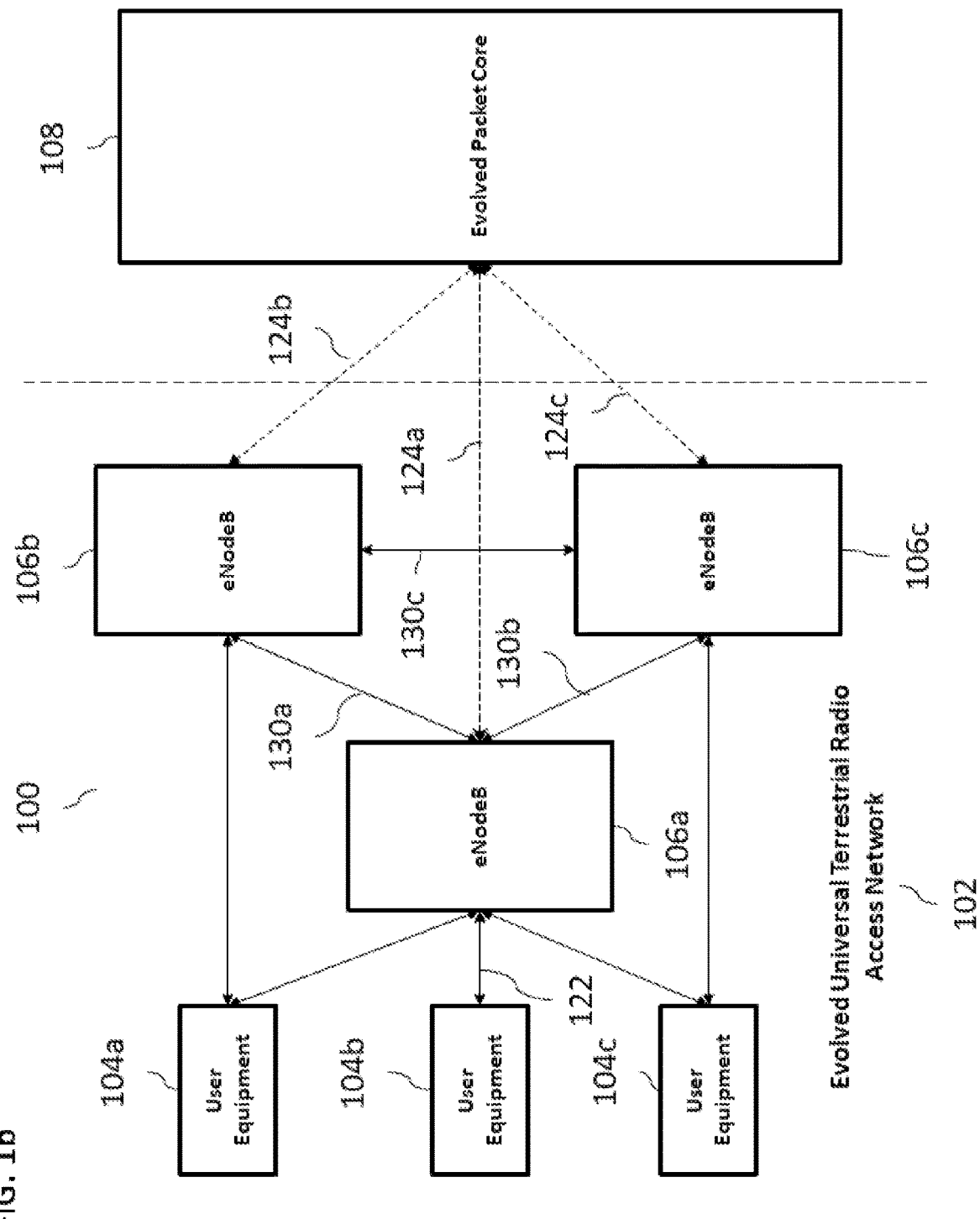

As shown in FIG. 1*a*, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (*a, b, c*) (as shown in FIG. 1*b*) that provide communication capabilities to a plurality of user equipment 104(*a, b, c*). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
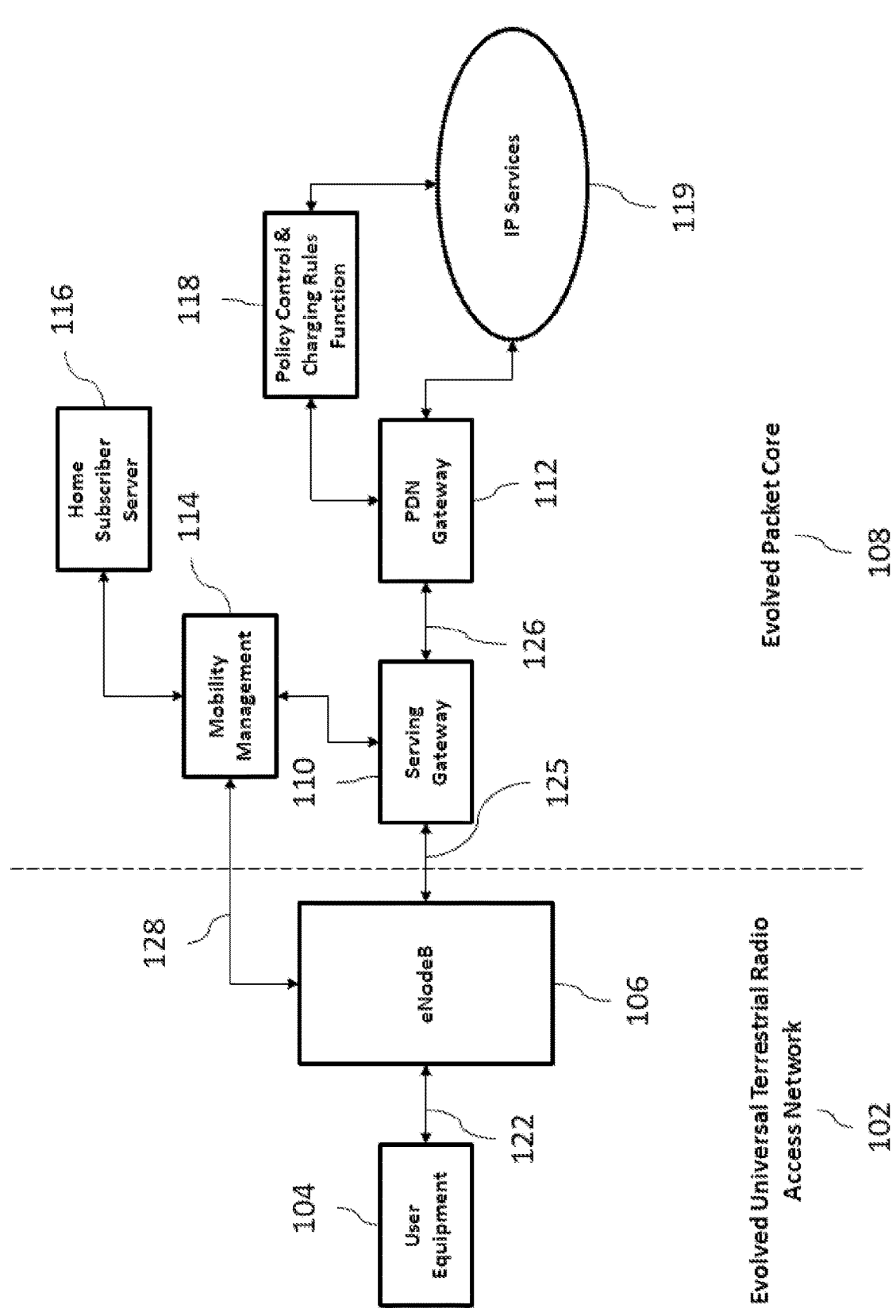

FIG. 1*b* illustrates further detail of the network 100 shown in FIG. 1*a*. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1*c*) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1*b*, the air interface 122 provides communication between user equipment 104*b* and the eNodeB 106*a*. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1*c*). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130 (*a, b, c*). As shown in FIG. 1*b*, X2 interface 130*a* provides interconnection between eNodeB 106*a* and eNodeB 106*b*; X2 interface 130*b* provides interconnection between eNodeB 106*a* and eNodeB 106*c*; and X2 interface 130*c* provides interconnection between eNodeB 106*b* and eNodeB 106*c*. The X2 interface can be established between two eNodeBs in order to provide an exchange of signals, which can include a load- or interference-related information as well as handover-related information. The eNodeBs 106 communicate with the evolved packet core 108 via an S1 interface 124 (*a, b, c*). The S1 interface 124 can be split into two interfaces: one for the control plane (shown as control plane interface (S1-MME interface) 128 in FIG. 1*c*) and the other for the user plane (shown as user plane interface (S1-U interface) 125 in FIG. 1*c*).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
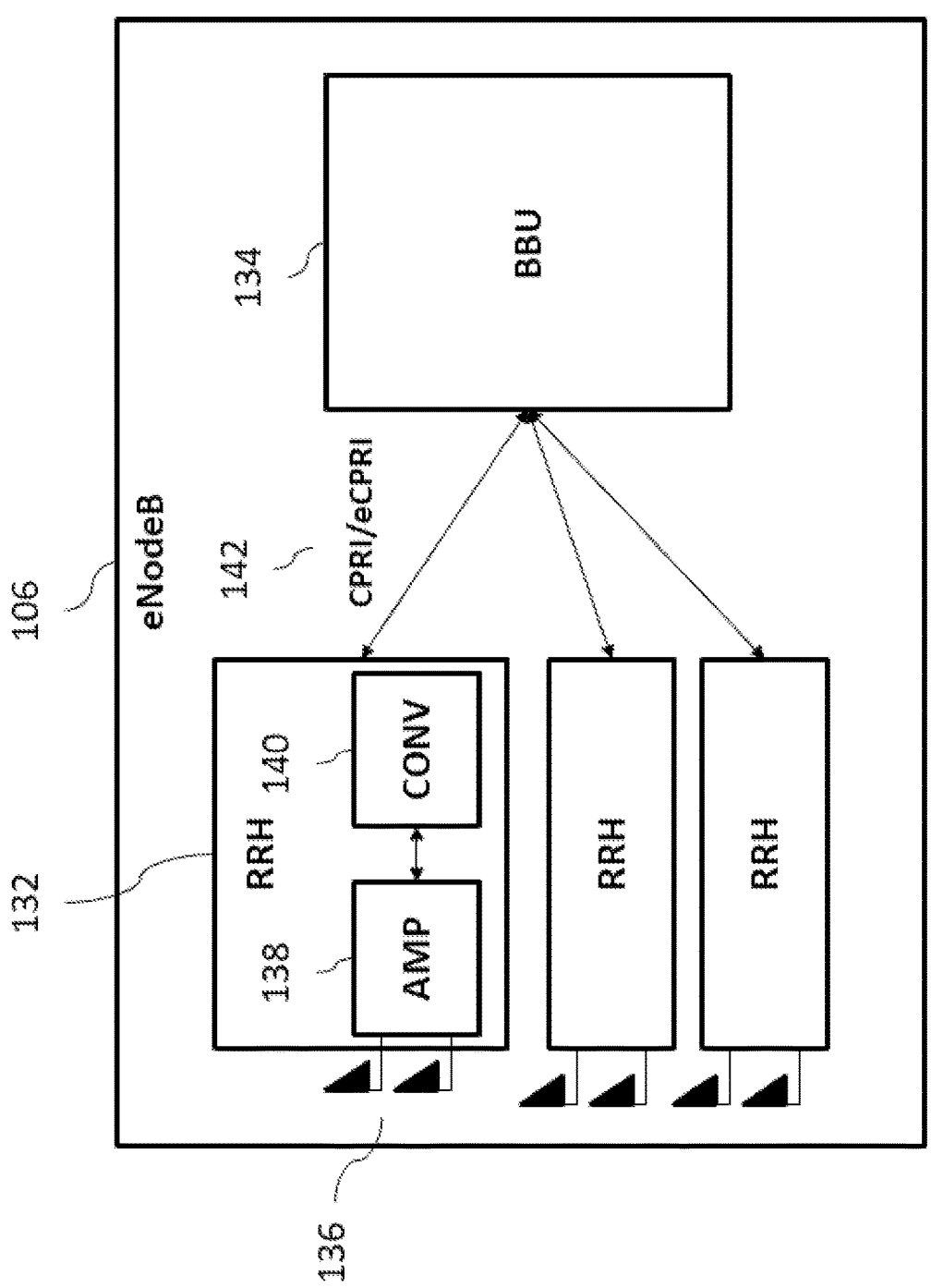

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHZ), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
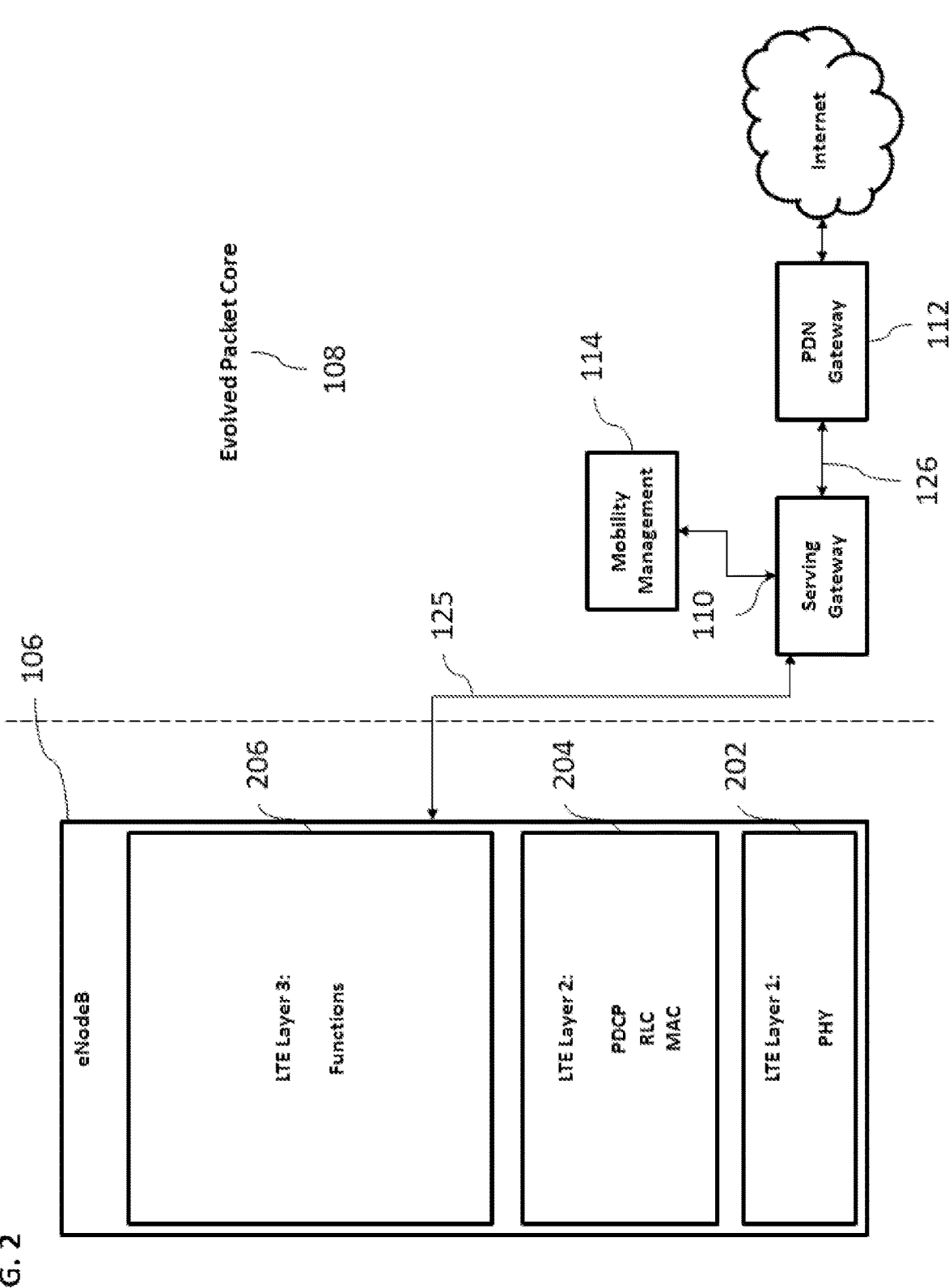
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
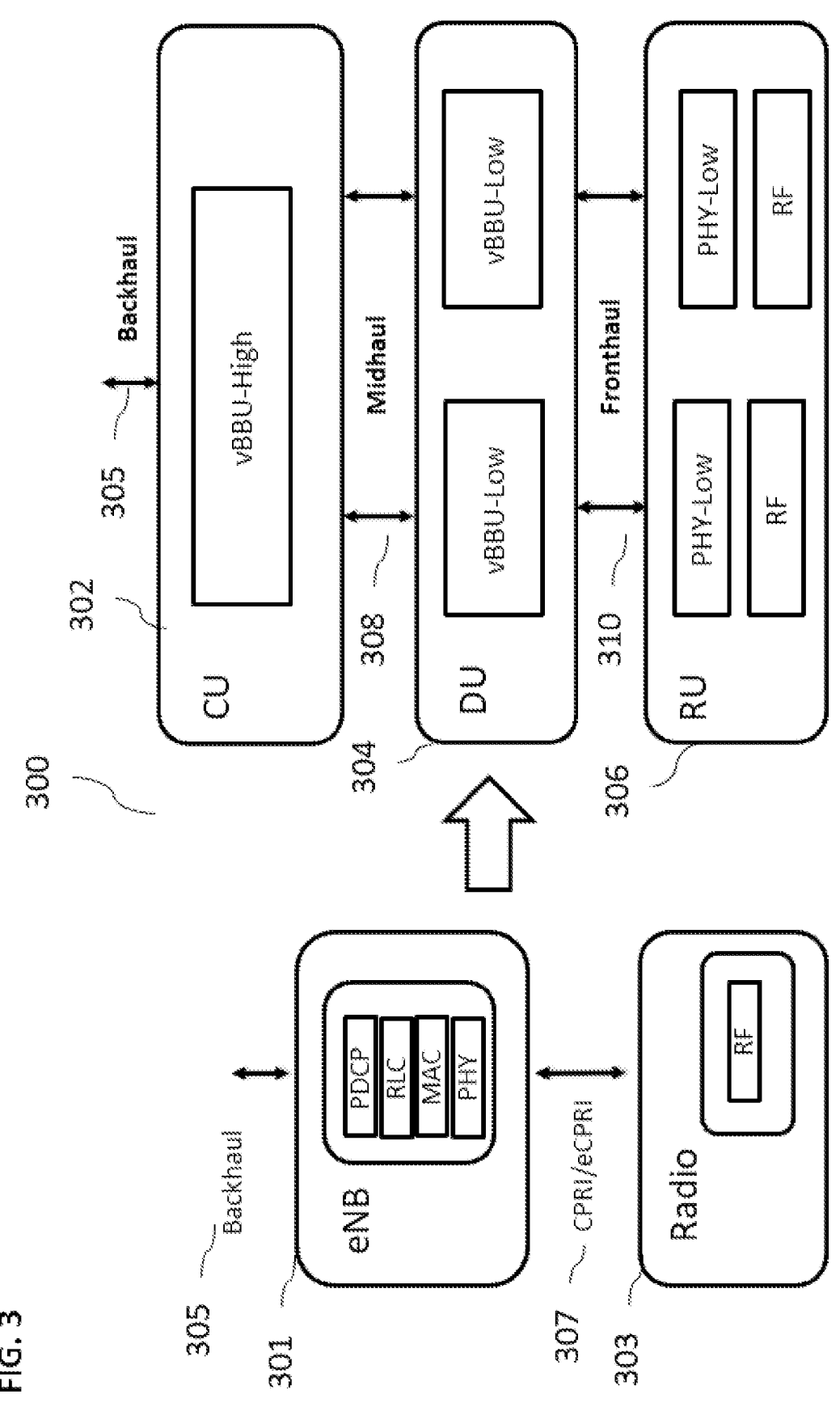
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

FIG. 4 illustrates an exemplary communications system 400 that can implement a 5G technology and can provide its users with use of higher frequency bands (e.g., greater than 10 GHZ). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
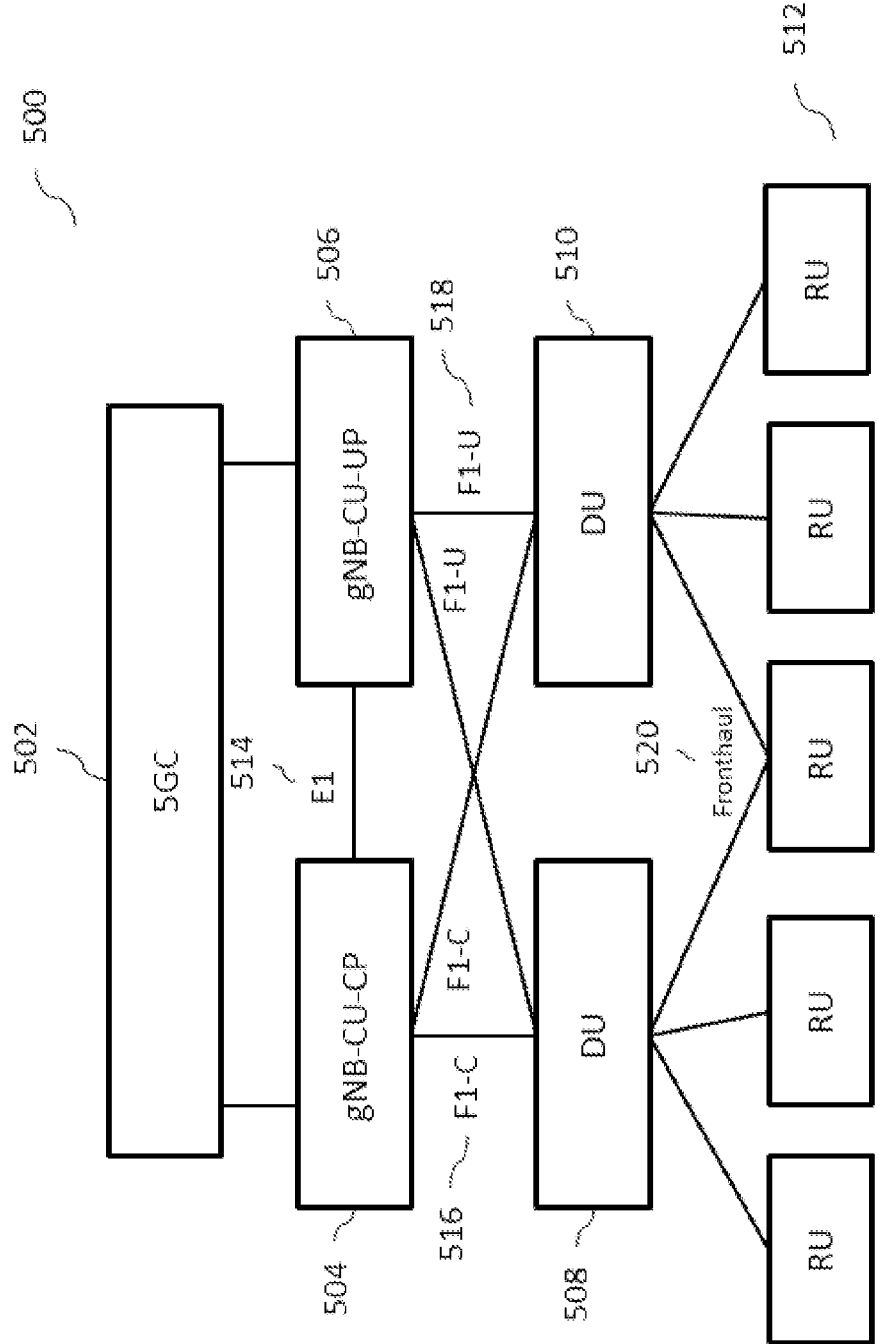
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
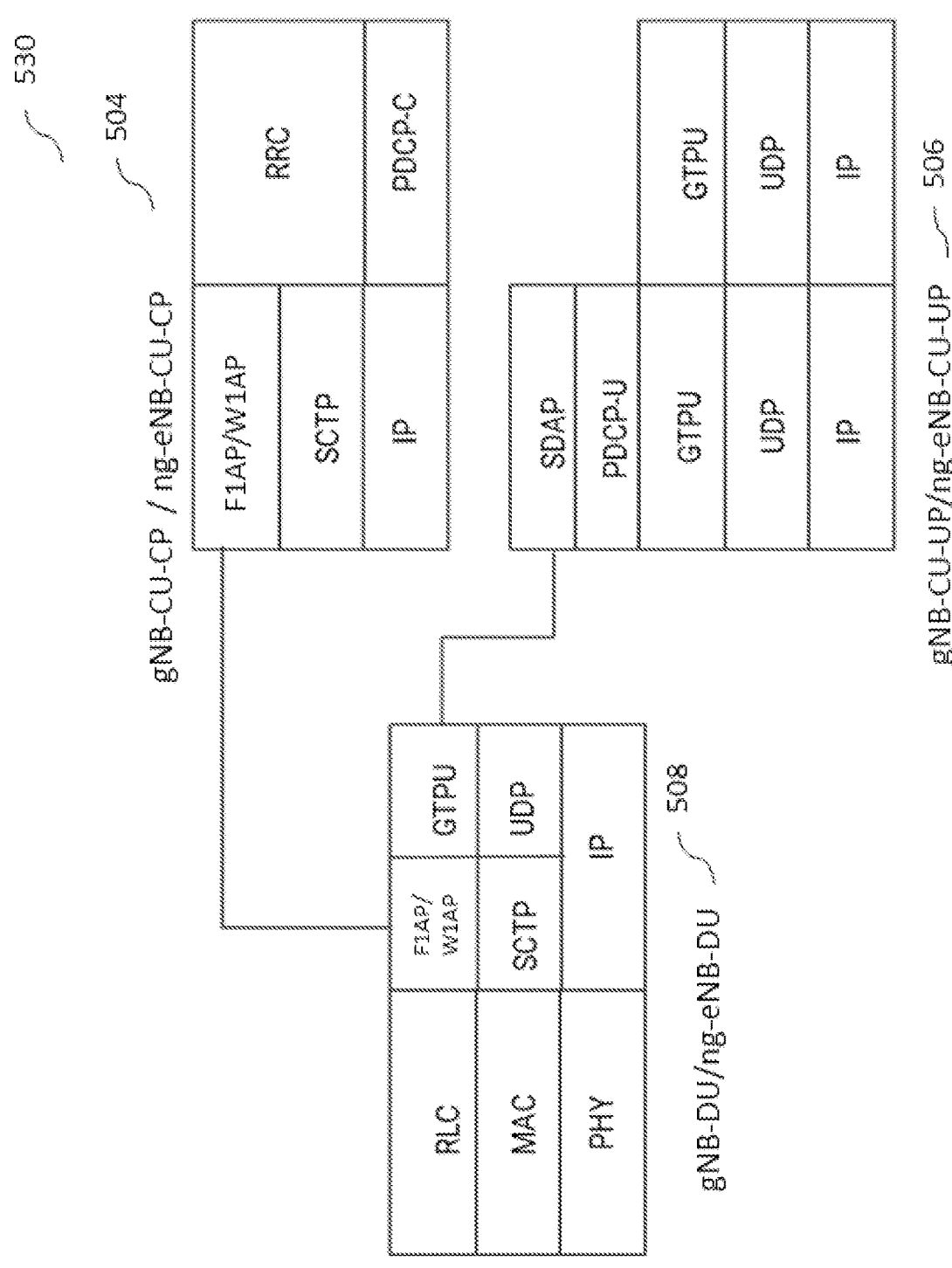
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP, and IP sublayers.

Figure 5C:
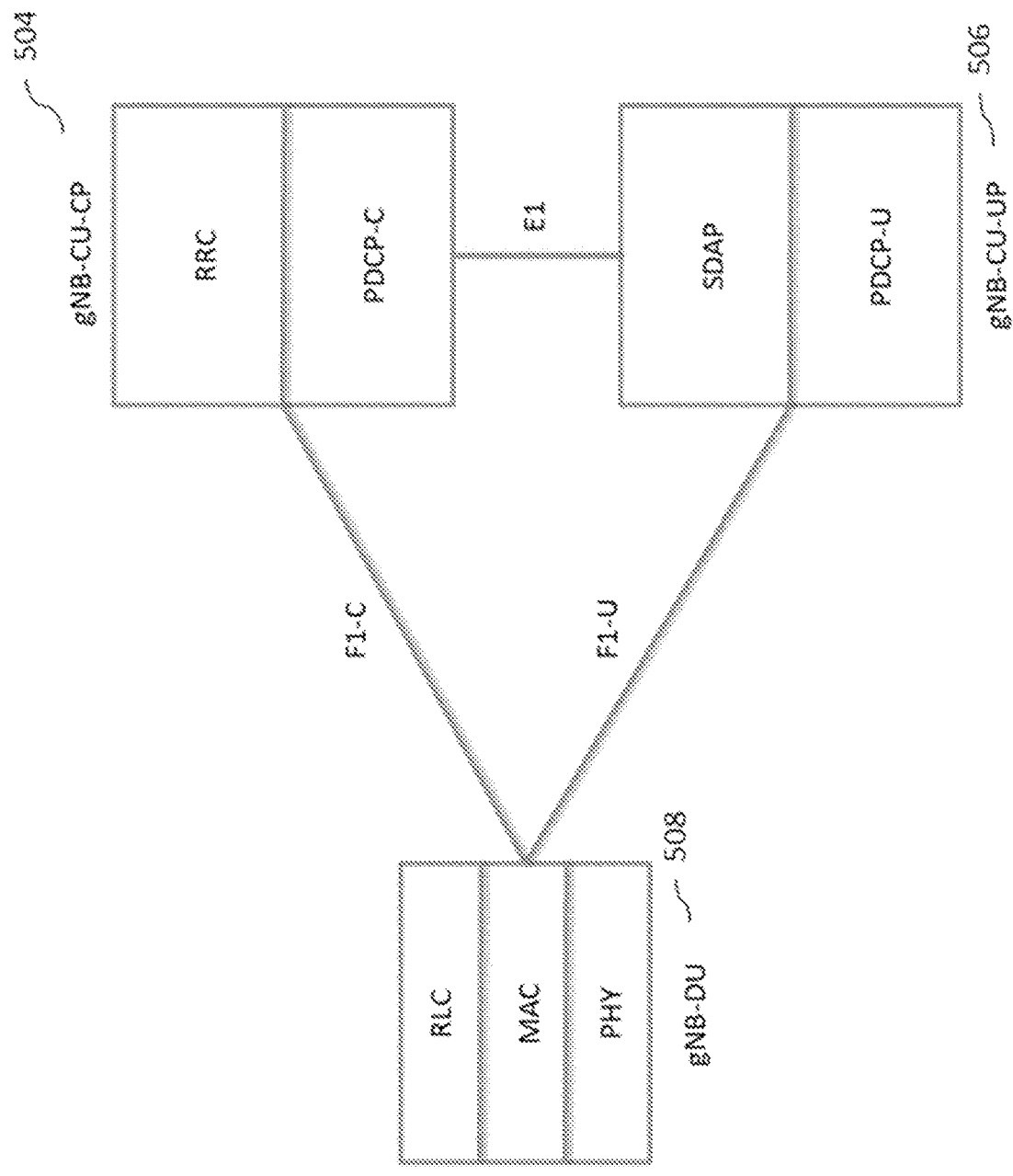
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and gNB-CU-UP 506 using an F1-C communication interface. The gNB-CU-CP 504 and gNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming. RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Storing Persistent Data Using NETCONF Operational Data

In some implementations of the current subject matter, state information for at least one microservice of a DU (e.g., DU 304 of FIG. 3, DUs 508, 510 of FIGS. 5a-5c. DU 806 of FIG. 8, etc.) of a base station (e.g., eNodeB 106 of FIGS.

Figure 6:
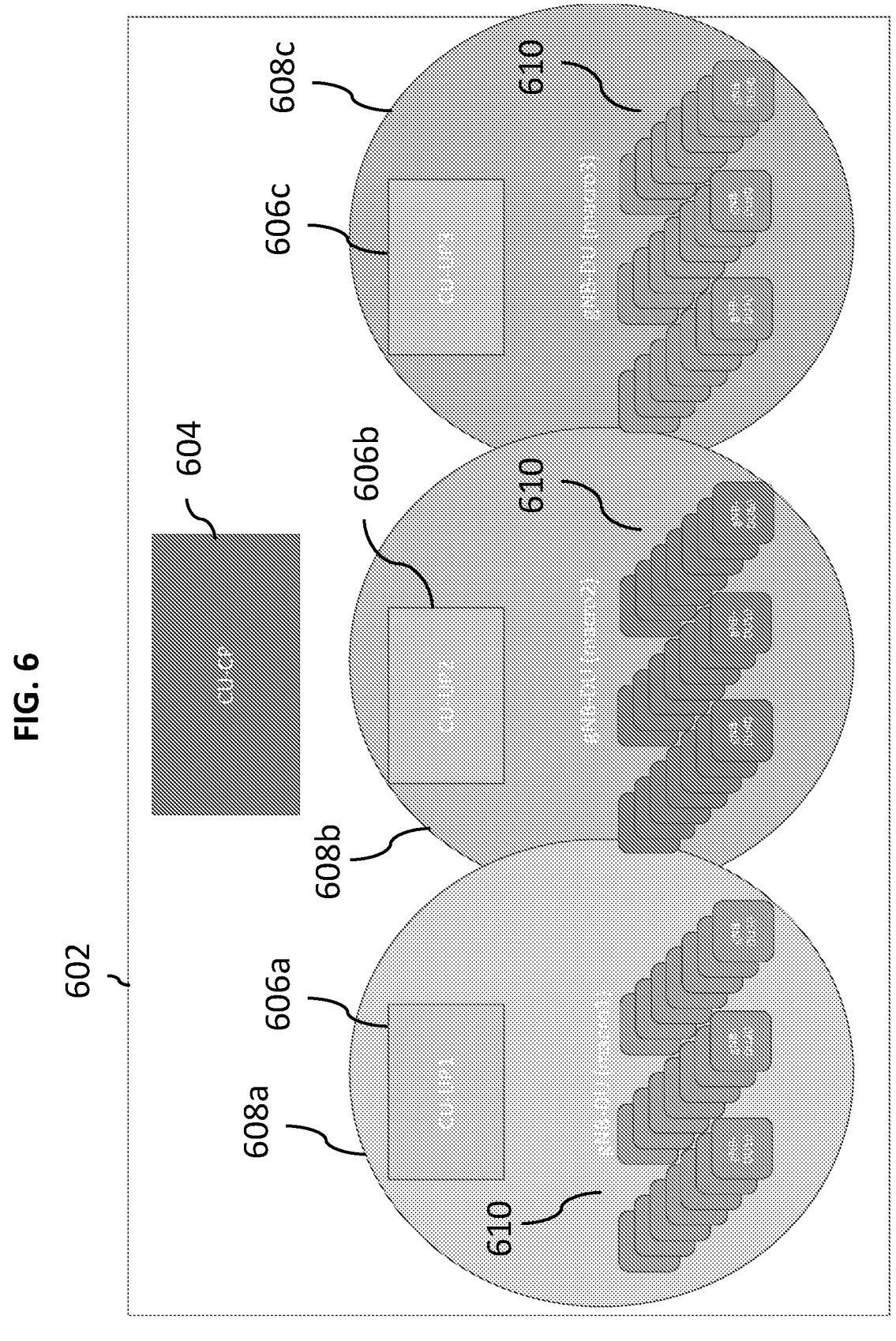
FIG. 6 illustrates an exemplary system, according to some implementations of the current subject matter.

1b-2, gNodeB of FIG. 5a, gNodeB 602 of FIG. 6, a next generation RAN (NG-RAN) node such as an eNodeB or a gNodeB, etc.) in a wireless communications system can be stored persistently using NETCONF operational data. Thus, when the DU is restarted or rebooted, such as because of a software crash, because of maintenance downtime planned by an operator of the DU, or because of another reason, the at least one microservice's state information from before the restart or reboot can be retrieved and used by the DU. More particularly, following the restart or reboot, the DU can begin operation of the at least one microservice using the most recent persistently stored state information for the at least one microservice, thereby allowing the DU to begin operation of the at least one microservice using state information more likely to be appropriate for each particular microservice than if default state information is used to operate the at least one microservice the following restart or reboot. State information for the at least one microservice therefore does not need to be re-established following the restart or reboot, which may reduce delays in UE service that would otherwise result from needing to re-establish the state information from its default setting.

A DU, such as mmWave DUs and small cell DUs, traditionally has very limited raw file storage that can be used to persistently store data for network functions (NFs). Further, a DU's raw file storage is typically used for vendor-specific (operator-specific) data and for storage of operating system (OS) provided information and thus lacks sufficient space for storage of all microservices' state information. State information for microservices of a DU therefore cannot traditionally be stored persistently.

A NETCONF server traditionally has a relatively large amount of raw file storage that can be used to persistently store data. However, a NETCONF server does not traditionally receive state information for microservices of a DU and is otherwise not aware of state information for a DU's microservices, so the NETCONF server's available persistent storage cannot be used for storing microservice state information. Using NETCONF operational data to persistently store microservices' state information as described herein may allow for the NETCONF server to persistently store microservice state information, e.g., using a YANG model structure, and for a DU to use the persistently stored microservice state information. Storing microservice state information in a NETCONF server's persistent data storage may provide for reliable storage against data corruption scenarios, such as scenarios requiring DU restart or reboot. Storing microservice state information in a NETCONF server's persistent data storage may take advantage of NETCONF's traditional use for configuration management (CM) solutions such that no additional software stack need be implemented to achieve the storing of persistent data using NETCONF operational data as described herein. Storing microservice state information in a NETCONF server's persistent data storage may allow for multiple readers and multiple writers to easily access the data. Restart or reboot of a NETCONF server would not cause deletion of microservice state information stored in a NETCONF server's persistent data storage, due to the data being persistently stored, and thus would not affect a DU's ability to self-recover or self-retrieve state information following restart or reboot of the DU.

One example of state information for a microservice is cell state information. Cell state information relates to a timing lock or a timing manager application that provides for time synchronization with an external source (external to the DU that includes the microservice and external to the base station that includes the DU). Time synchronization as defined in the cell state information for a microservice allows communications to/from the DU with respect to that microservice to be time-synchronized for proper transmission and receipt.

Another example of state information for a microservice is baseband state information. Baseband state information relates to baseband sector and carrier signaling. Sector and carrier signaling as defined in the baseband state information for a microservice allows for proper signal transmission to/from the DU with respect to that microservice.

Another example of state information for a microservice is CU-CP connection information. As discussed above, a DU is configured to be communicatively coupled to a CU using an F1 interface and is configured to be communicatively coupled to a control plane portion of the CU using an F1-C interface. CU-CP connection information relates to the DU's F1-C connection with the CU-CP and allows for communications between the DU and CU-CP with respect to the microservice to occur as set up during establishment of the F1-C connection.

A particular microservice can have one or more types of state information associated therewith.

FIG. 6 illustrates an exemplary system 600 configured to handle DU state information and recovery using NETCONF operational data. A base station 602 in this illustrated implementation is a gNB configured to be in a 5G wireless communication system similar to the 5G wireless communication system 500 of FIG. 5a discussed above, but other base stations (in various wireless communications systems, including 5G New Radio communications systems, 6G or later communications systems, LTE communication systems, etc.) can be similarly configured and used in storing persistent data using NETCONF operational data. In the illustrated implementation of FIG. 6, the base station 602 includes a CU that includes a CU-CP 604 and a plurality of CU-UPs 606a, 606b, 606c. The CU-CP 604 is configured to be communicatively coupled to the CU-UPs 606a, 606b, 606c using an E1 communication interface. The base station 602 includes three CU-UPs 606a, 606b, 606c in this illustrated implementation but can include another number of CU-UPs. The CU of the base station 602 is configured to be communicatively coupled with a core network (not shown in FIG. 6), e.g., the 5GC 502 of FIG. 5a, etc.

The base station 602 also includes a plurality of DUs. In this illustrated implementation the base station 602 includes sixty-six DUs but can include another plural number of DUs. The CU-CP 604 is configured to be communicatively coupled to the DUs using F1-C communication interfaces. The CU-UPs 606a, 606b, 606c are configured to be communicatively coupled to the DUs using F1-U communication interfaces.

In the illustrated implementation of FIG. 6, three of the DUs 608a, 608b, 608c are macro cells (labeled macro1, macro2, and macro3 in FIG. 6), and sixty-three of the DUs 610 small cells (nine of which are labeled in FIG. 6 as gNB-DU10, gNB-DU20, gNB-DU30, gNB-DU40, gNB-DU50, gNB-DU60, gNB-DU70, gNB-DU80, and gNB-DU90). The base station 602 can include another number of macro cells and/or another number of small cells. The macro1 DU 608a, the macro2 DU 608b, and twenty-one of the small cell DUs 610 including gNB-DU10, gNB-DU20, and gNB-DU30 are configured to be served by the first CU-UP 606a (labeled CU-UP1 in FIG. 6). The macro1 DU 608a, macro2 DU 608b, macro3 DU 608c, and twenty-one of the small cell DUs 610 including gNB-DU40, gNB-DU50, and gNB-DU60) are configured to be served by the second CU-UP 606b (labeled CU-UP2 in FIG. 6). The macro2 DU 608b, macro3 DU 608c, and twenty-one of the small cell DUs 610 including gNB-DU70, gNB-DU80, and gNB-DU90 are configured to be served by the third CU-UP 606c (labeled CU-UP3 in FIG. 6).

In the implementation shown in FIG. 6, each CU-UP 606a, 606b, 606c is serving a subset of DUs 610, 608a, 608b, 608c for all microservices. However, a CU-UP can serve all the DUs 610, 608a, 608b, 608c of the base station 602 for one microservice (e.g., enhanced mobile broadband (eMBB) or other microservice), while serving a subset of the DUs 610, 608a, 608b, 608c for another microservice (e.g., vehicle-to-everything (V2X), ultra-reliable low latency communication (URLLC), or other microservice).

The base station 602 also includes a plurality of RUs (not shown in FIG. 6). The RUs are configured to be communicatively coupled to the DUs via a fronthaul network. Additionally, each of the RUs is configured to be communicatively coupled to one or more UEs (not shown in FIG. 6).

FIG. 7 illustrates an exemplary method 700, according to some implementations of the current subject matter. The method 700 is described with respect to an exemplary system 800 illustrated in FIG. 8 but can be implemented similarly with other systems, e.g., the system 100 of FIGS. 1a-1c and 2, the system 400 of FIG. 4, the system 500 of FIG. 5a, the system of FIG. 6, etc. The system 800 of FIG. 8 can be implemented in a variety of wireless communications systems, as mentioned above, such as LTE wireless communications systems, a 5G wireless communications system, or 6G or later generation wireless communications systems.

Figure 8:
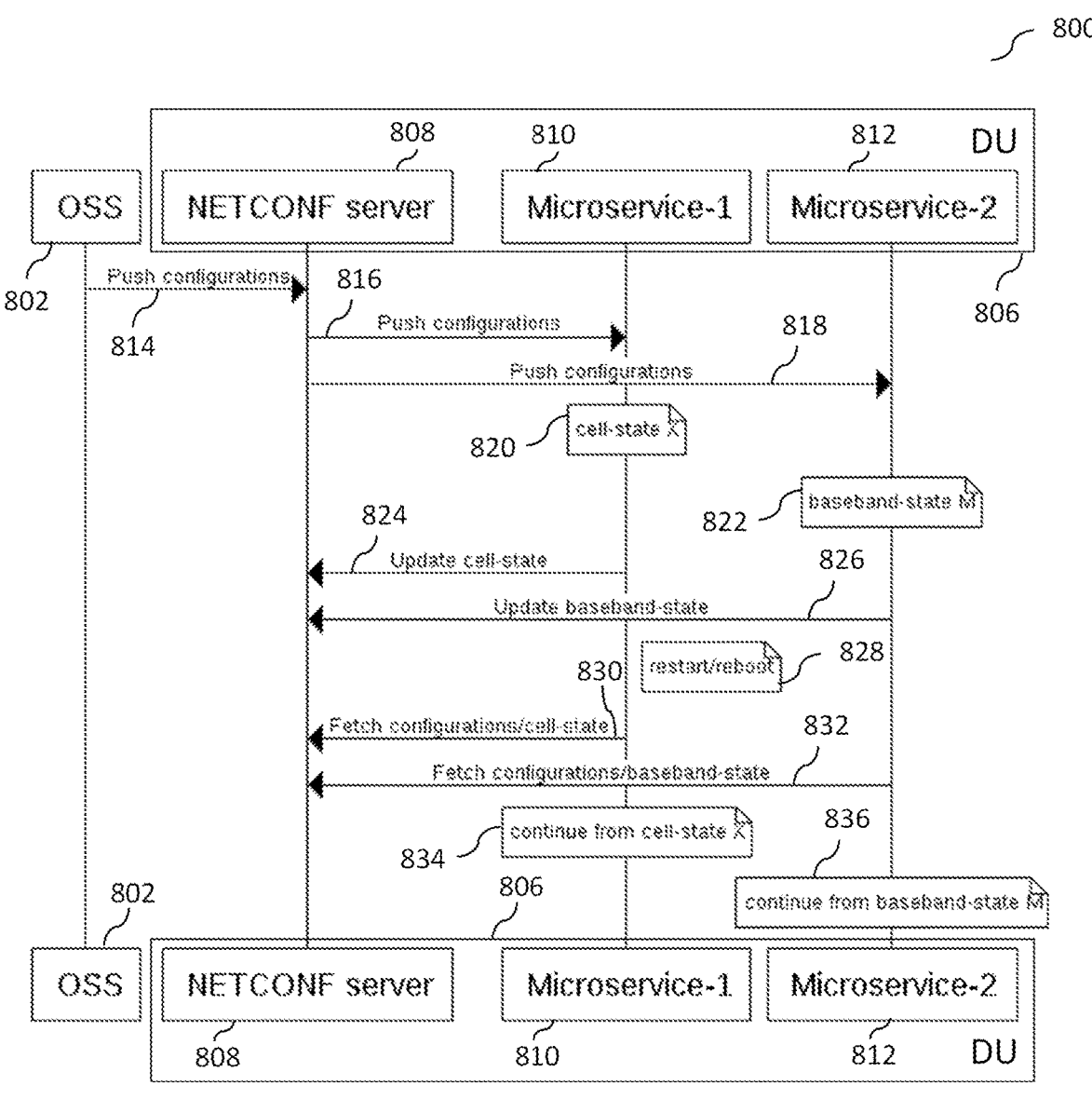
FIG. 8 illustrates another exemplary system, according to some implementations of the current subject matter.

As shown in FIG. 8, the system 800 includes an operations support system (OSS) 802 and a DU 806 (e.g., DU 304 of FIG. 3, DU 508 of FIGS. 5a-5c. DU 510 of FIG. 5a, DUs 608a, 608b, 608c of FIG. 6, DUs 610 of FIG. 6, etc.) of a base station (e.g., eNodeB 106 of FIGS. 1b-2, the gNodeB of FIG. 5a, a gNodeB 624 of FIG. 6, a next generation RAN (NG-RAN) node such as an eNodeB or a gNodeB, etc.). The base station includes other components, such as an RU (e.g., RU 306 of FIG. 3, RUs 512 of FIG. 5a, etc.) and a CU (e.g., CU 302 of FIG. 3, the CU of FIGS. 5a-5c including CU-CP 504 and CU-UP 506, the CU of FIG. 6 including CU-CP 604 and CU-UPs 606a, 606b, 606c, etc.), not shown in FIG. 8.

The OSS 802 is configured to be communicatively coupled with a core network (not shown in FIG. 8), e.g., EPC 108 of FIGS. 1a-1c and 2, 5GC 502 of FIG. 5a, etc. In some implementations, the operations support system 802 can include an operations support system/business support system (OSS/BSS).

The DU 806 as shown in FIG. 8 includes at least one microservice. In this illustrated implementation, the at least one microservice of the DU 806 includes a first microservice 810 (labeled Microservice-1 in FIG. 8) and a second microservice 812 (labeled Microservice-2 in FIG. 8). In other implementations, the DU 806 can include another number of microservices. A DU typically includes a much greater number of microservices than two. In general, a microservice is an architectural design in which a software application is designed as a set of smaller services configured to communicate using application programming interfaces (APIs). A DU's microservices typically vary in different vendor (operator) implementations of DUs and can therefore be vendor-specific (operator-specific).

As shown in FIG. 7, the method 700 includes the NETCONF server 808 receiving 702 initial configuration information for at least microservice from the OSS 802. As shown in FIG. 8, the NETCONF server's receipt 702 of the initial configuration information for at least microservice can include the OSS 802 pushing 814 the initial configuration information to the NETCONF server 808. The initial configuration information defines default configuration information that the DU 806 can use to begin initial operation of the first and second microservices 810, 812.

The NETCONF server 808 transmits 704 the initial configuration information to each of the DU's microservices 810, 812, thereby allowing the microservices 810, 812 to become operational using the initial configuration information. As shown in FIG. 8, the transmission 704 of the initial configuration information from the NETCONF server 808 to the first microservice 810 can include the NETCONF server 808 pushing 816 the initial configuration information to the first microservice 810 and pushing 818 the initial configuration information to the second microservice 812.

The microservices 810, 812 store 706, e.g., in a data structure or memory, their respective received configuration information, which includes state information. As mentioned above, this storage 706 is not persistent storage. As shown in FIG. 8, the configuration information stored 706 for the first microservice 810 includes cell state information 820, shown as a cell state of "X" in FIG. 8, and the configuration information stored 706 for the second microservice 812 includes baseband state information 822, shown as a baseband state of "M" in FIG. 8.

Having state information stored and available for use, each of the DU's microservices 810, 812 becomes 708 operational using its respective state information. As indicated above, the microservices 810, 812 initially operate using default configuration information, which in this illustrated implementation includes cell state "X" for the first microservice 810 and baseband state "M" for the second microservice 812.

Over time, a microservice's state information can change, and typically does change one or more times, during the DU's use in providing service to one or more UEs (not shown in FIG. 8) that are communicatively coupled with the RU of the base station, as different UEs can have different service requirements and as a particular UE's service requirements may change over time. The initially stored 706 state information for a microservice can therefore change over time. When the state information for a microservice changes, the new, current state information is stored, e.g., non-persistently in a data structure or memory, for use until (and if) the state information changes again.

As shown in FIG. 7, the NETCONF server 808 receives 710 periodic state information updates from each of the microservices 810, 812. The NETCONF server 808 can receive 710 the state information updates via APIs of the NETCONF server 808, such as configuration database (CDB) APIs. As mentioned above, the NETCONF server 808 is already configured to use APIs, in accordance with 3GPP and O-RAN standards, such that additional software need not be installed for the NETCONF server 808 to receive 710 state information updates from the microservices 810, 812. The updated state information transmitted by the microservices 810, 812 to the NETCONF server 808 is timestamped, which allows the NETCONF server 808 to know which state information for a particular microservice is the most recent state information for that microservice. As shown in FIG. 8, the first microservice's state information update transmission 824 to the NETCONF server 808 includes cell state information (e.g., an update changing the first microservice's cell state from "X" to "Y"), and the second microservice's state information update transmission 826 to the NETCONF server 808 includes baseband state information (e.g., an update changing the second microservice's baseband state from "M" to "N"). FIG. 8 shows the first microservice 810 transmitting 824 its updated state information to the NETCONF server 808 before the second microservice 812 transmits 826 its updated state information to the NETCONF server 808, but updates from the DU's microservices 810, 812 can be transmitted in any order to the NETCONF server 808. Additionally, FIG. 8 shows for simplicity only one update transmitted 824, 826 to the NETCONF server 808 for each of the microservices 810, 812, but any number of updates can be transmitted from each of the microservices 810, 812 prior to DU 806 restart or reboot 714, 828.

The frequency at which each of the microservices 810, 812 transmits 824, 826 updated state information to the NETCONF server 808 can be the same for each of the microservices 810, 812 or can be different from each other. In some implementations, a microservice can be configured to transmit updated state information to the NETCONF server 808 in response to a change in the microservice's state information, e.g., the first microservice 810 being triggered to transmit an update changing the first microservice's cell state from "X" to "Y" in response to the change to cell state "Y" and the second microservice 812 being triggered to transmit an update changing the second microservice's baseband state from "M" to "N" in response to the change to baseband state "N." The NETCONF server 808 can thus be kept up to date on each microservice's state information without receiving state information from the microservices 810, 812 when there has been no change in state information, which may help conserve bandwidth and/or NETCONF server 808 storage space.

In some implementations, a microservice can be configured to transmit updated state information to the NETCONF server 808 according to a predetermined time schedule, e.g., every one second, every five seconds, etc. Transmission of regularly scheduled updates to the NETCONF server 808 may help ensure that the NETCONF server 808 always has timely state information for the microservices 810, 812.

In some implementations, a microservice can include multiple types of state information, each of which may be updated to the NETCONF server 808 according to its own predetermined time schedule or in response to a change in the particular state information. The NETCONF server 808 can therefore receive state information on a rolling basis as appropriate for different types of state information. Alternatively, the microservice can be configured to periodically transmit updated state information for all of its two or more types of state information, which may allow for a particular microservice's state information to all share a same timestamp and thus be clearly identified to the NETCONF server 808 as the microservice's most recent state information.

Referring again to FIG. 7, the NETCONF server 808 stores 712 the state information received 710 from the microservices 810, 812 as operational data in persistent data storage of the NETCONF server 808. The NETCONF server 808 does not need to use this stored state information, as it is not responsible for execution of the microservices 810, 812, except in a management capacity by storing the state information for retrieval, if needed. The state information can be stored 712 in the NETCONF server's operational DB or in another database of the NETCONF server 808 such as a MongoDB or other database.

At some point during operation of the DU 806, during which time each of the microservices 810, 812 may provide one or more state information updates to the NETCONF server 808 as discussed above, the DU 806 may need to be restarted or rebooted 714, 828. After the restart or reboot 714, 828, the microservice 810, 812 fetch 716 their respective state information from the NETCONF server 808 which, as discussed above, previously stored the microservices' state information. The most recent state information, as indicated by timestamp data, is fetched 716. The microservices 810, 812 can therefore retrieve their most recent state information as stored by the NETCONF server 808 to use in beginning operation following restart/reboot 814, 828 instead of starting over from scratch by using default configuration information. Specifically, at least one of the microservices 810, 812 may recover 718 the DU to operational state based on the fetching 716. In some instances, the most recent configuration information may be the default configuration information, depending on when the DU restart/reboot 714, 828 occurs and on a particular microservice's configuration. As shown in FIG. 8, the first microservice's fetching 716 of state information from the NETCONF server 808 includes fetching 830 cell state information, and the second microservice's fetching 716 of state information from the NETCONF server 808 includes fetching 832 baseband state information.

The microservices 810, 812 store 706 their respective fetched 716 state information, e.g., in a data structure or memory. The method 700 then continues as discussed above.

In some implementations, instead of state information for at least one microservice of a DU being persistently stored at a NETCONF server in a persistence layer API as mentioned above, the state information for at least one microservice can be persistently stored in raw file storage of the NETCONF server's OS. Such raw file storage is traditionally very limited, and may be more susceptible to corruption than data stored in a persistence layer API, but the raw file storage is also an option for persistently storing data the NETCONF server.

Figure 9:
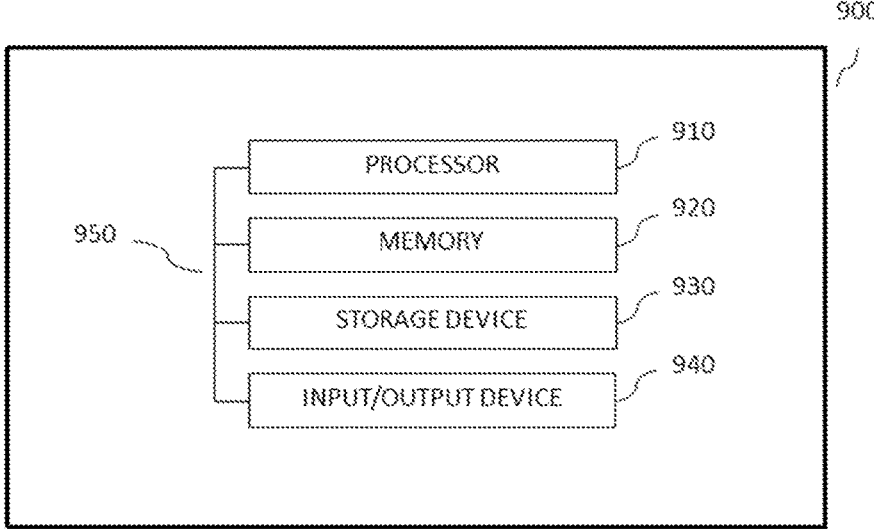
FIG. 9 illustrates yet another exemplary system, according to some implementations of the current subject matter.

In some implementations, the current subject matter can be configured to be implemented in a system 900, as shown in FIG. 9. The system 900 can include one or more of a processor 910, a memory 920, a storage device 930, and an input/output device 940. Each of the components 910, 920, 930 and 940 can be interconnected using a system bus 950. The processor 910 can be configured to process instructions for execution within the system 600. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device.

In alternate implementations, the input/output device 940 can include a display unit for displaying graphical user interfaces.

Figure 10:
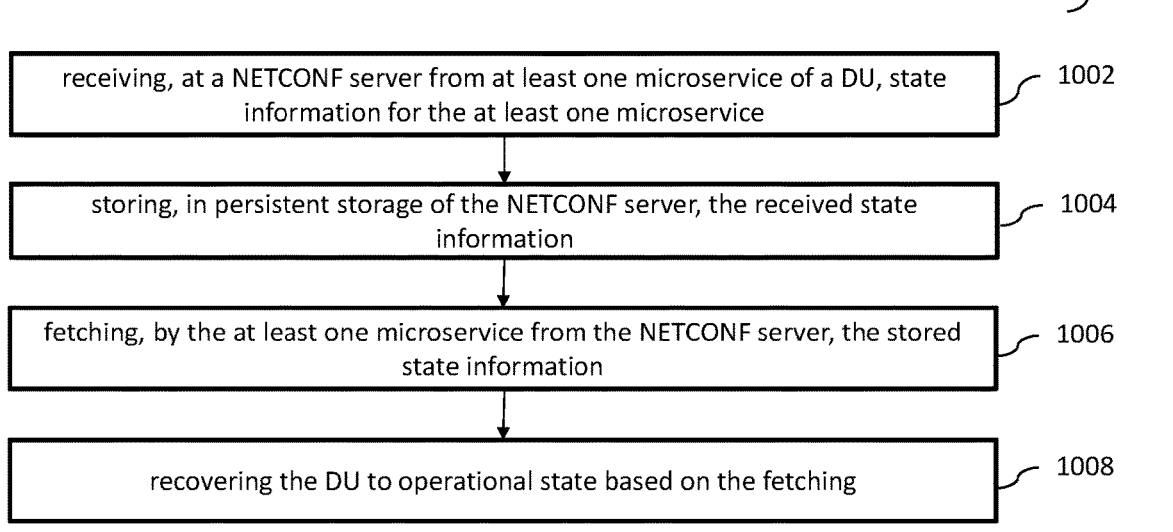
FIG. 10 illustrates an exemplary method, according to some implementations of the current subject matter.

FIG. 10 illustrates an exemplary method 1000 for storing persistent data using NETCONF operational data, according to some implementations of the current subject matter. The method 1000 may be performed, for example, using implementations shown in and described with respect to FIGS. 6-8.

The method 1000 includes receiving 1002, at a NETCONF server from at least one microservice of a DU, state information for the at least one microservice, storing 1004, in persistent storage of the NETCONF server, the received state information, fetching 1006, by the at least one microservice from the NETCONF server, the stored state information, and recovering 1008, e.g., by the at least one microservice, from the NETCONF server, the DU to operational state based on the fetching 1006.

In some implementations, the current subject matter can include one or more of the following optional features.

In some implementations, the at least one microservice can fetch the state information following a restart or a reboot of the DU for the purpose of recovering 1008 the DU to the operational state.

In some implementations, the method can further include receiving, at the NETCONF server from the at least one microservice, at least one update to the state information for the at least one microservice, the method can further include storing, in persistent storage of the NETCONF server, the received updated state information, and the at least one microservice can fetch 1006 the state information most recently received by the NETCONF server for the purpose of recovering 1008 the DU to the operational state after a restart or a reboot.

In some implementations, the NETCONF server can receive 1002 the state information via an application programming interface (API) layer.

In some implementations, the method can further include storing, in non-persistent storage of the DU, the state information for the at least one microservice.

In some implementations, the state information can include at least one of cell state information, baseband state information, and centralized unit control plane (CU-CP) connection information.

In some implementations, a base station can include the NETCONF server and the DU, and the base station can include a gNodeB or an eNodeB.

In some implementations, a wireless communication system base station can include the at least one processor and the at least one non-transitory storage media.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. An apparatus, comprising:
   at least one processor; and
   at least one non-transitory storage media storing instructions that, when executed by the at least one processor, cause the at least one processor to perform operations comprising:
      receiving, at a Network Configuration Protocol (NETCONF) server from at least one microservice of a distributed unit (DU), state information for the at least one microservice,
      storing, in persistent storage of the NETCONF server, the received state information,
      fetching, by the at least one microservice from the NETCONF server, the received state information stored in the persistent storage of the NETCONF server; and
   recovering the DU to operational state based on the fetching,
      wherein the state information includes at least one of cell state information and baseband state information, wherein the cell state information specifies time synchronization information, and wherein the baseband state information specifies baseband sector and carrier signaling information, and wherein the received state information is received on a per-microservice basis, wherein the operations further comprise:

receiving, at the NETCONF server from the at least one microservice, at least one update to the state information for the at least one microservice, and storing, in persistent storage of the NETCONF server, the received updated state information, and wherein the at least one microservice fetches the state information most recently received by the NETCONF server for the purpose of recovering the DU to the operational state after a restart or a reboot.

2. The apparatus of claim 1, wherein the at least one microservice fetches the state information following a restart or a reboot of the DU for the purpose of recovering the DU to the operational state.

3. The apparatus of claim 1, wherein the NETCONF server receives the state information via an application programming interface (API) layer.

4. The apparatus of claim 1, wherein the operations further comprise storing, in non-persistent storage of the DU, the state information for the at least one microservice.

5. The apparatus of claim 1, wherein the state information further includes centralized unit control plane (CU-CP) connection information.

6. The apparatus of claim 1, wherein a base station includes the NETCONF server and the DU; and the base station includes a gNodeB or an eNodeB.

7. The apparatus of claim 1, wherein a wireless communication system base station includes the at least one processor and the at least one non-transitory storage media.

8. At least one non-transitory storage media storing instructions that, when executed by at least one processor, cause the at least one processor to perform operations comprising:

receiving, at a Network Configuration Protocol (NETCONF) server from at least one microservice of a distributed unit (DU), state information for the at least one microservice;

storing, in persistent storage of the NETCONF server, the received state information;

fetching, by the at least one microservice from the NETCONF server, the received state information stored in the persistent storage of the NETCONF server; and recovering the DU to operational state based on the fetching, wherein the state information includes at least one of cell state information and baseband state information, wherein the cell state information specifies time synchronization information, and wherein the baseband state information specifies baseband sector and carrier signaling information, and wherein the received state information is received on a per-microservice basis, wherein the operations further comprise:

receiving, at the NETCONF server from the at least one microservice, at least one update to the state information for the at least one microservice, and storing, in persistent storage of the NETCONF server, the received updated state information, and wherein the at least one microservice fetches the state information most recently received by the NETCONF server for the purpose of recovering the DU to the operational state after a restart or a reboot.

9. The at least one non-transitory storage media of claim 8, wherein the at least one microservice fetches the state information following a restart or a reboot of the DU for the purpose of recovering the DU to the operational state.

10. The at least one non-transitory storage media of claim 8, wherein the NETCONF server receives the state information via an application programming interface (API) layer.

11. The at least one non-transitory storage media of claim 8, wherein the operations further comprise storing, in non-persistent storage of the DU, the state information for the at least one microservice.

12. The at least one non-transitory storage media of claim 8, wherein the state information further includes centralized unit control plane (CU-CP) connection information.

13. A computer-implemented method, comprising:

receiving, at a Network Configuration Protocol (NETCONF) server from at least one microservice of a distributed unit (DU), state information for the at least one microservice;

storing, in persistent storage of the NETCONF server, the received state information;

fetching, by the at least one microservice from the NETCONF server, the received state information stored in the persistent storage of the NETCONF server; and recovering the DU to operational state based on the fetching, wherein the state information includes at least one of cell state information and baseband state information, wherein the cell state information specifies time synchronization information, and wherein the baseband state information specifies baseband sector and carrier signaling information, and wherein the received state information is received on a per-microservice basis, wherein the method further comprises:

receiving, at the NETCONF server from the at least one microservice, at least one update to the state information for the at least one microservice, and storing, in persistent storage of the NETCONF server, the received updated state information, and wherein the at least one microservice fetches the state information most recently received by the NETCONF server for the purpose of recovering the DU to the operational state after a restart or a reboot.

14. The method of claim 13, wherein the at least one microservice fetches the state information following a restart or a reboot of the DU for the purpose of recovering the DU to the operational state.

15. The method of claim 13, wherein the NETCONF server receives the state information via an application programming interface (API) layer.

16. The method of claim 13, further comprising storing, in non-persistent storage of the DU, the state information for the at least one microservice.

17. The method of claim 13, wherein the state information further includes centralized unit control plane (CU-CP) connection information.

* * * * *